United States Patent [19]
Kawaguchi et al.

[11] Patent Number: 6,165,243
[45] Date of Patent: Dec. 26, 2000

[54] ANTI-MOLD AND ANTI-BACTERIA AIR FILTER

[75] Inventors: Ei Kawaguchi, Kurashiki; Hideo Shiozawa, Tokyo, both of Japan

[73] Assignee: Hagihara Industries Inc., Japan

[21] Appl. No.: 09/336,979

[22] Filed: Jun. 21, 1999

[30] Foreign Application Priority Data

Jun. 22, 1998 [JP] Japan .................................. 10-174194

[51] Int. Cl.⁷ .............................. B01D 39/14; B32B 1/00
[52] U.S. Cl. ........................ 55/524; 55/528; 264/171.13
[58] Field of Search ............................ 55/524, 525, 527, 55/528, 529, DIG. 45; 264/172.16, 171.13

[56] References Cited

U.S. PATENT DOCUMENTS

| | | |
|---|---|---|
| 2,724,457 | 11/1955 | Besser . |
| 4,185,887 | 1/1980 | Ferrentino . |
| 4,422,837 | 12/1983 | Rasmussen . |
| 4,775,585 | 10/1988 | Hagiwara . |
| 4,784,909 | 11/1988 | Emi et al. ............................... 428/357 |
| 5,037,455 | 8/1991 | Scheineson ............................... 55/103 |
| 5,542,557 | 8/1996 | Koyama et al. . |
| 5,571,326 | 11/1996 | Boissonnat et al. . |
| 5,783,117 | 7/1998 | Byassee et al. . |
| 5,840,245 | 11/1998 | Coombs et al. . |
| 5,874,052 | 2/1999 | Holland . |
| 5,888,526 | 3/1999 | Tsubai . |
| 5,950,435 | 9/1999 | Koizuka ......................................... 62/1 |

FOREIGN PATENT DOCUMENTS

| | | |
|---|---|---|
| 9-225238 | 9/1997 | Japan . |
| 10-000315 | 1/1998 | Japan . |
| 10-174823 | 6/1998 | Japan . |
| 10-216432 | 8/1998 | Japan . |
| 11-090133 | 4/1999 | Japan . |

*Primary Examiner*—Chester T. Barry
*Attorney, Agent, or Firm*—Kilpatrick Stockton LLP

[57] ABSTRACT

The present invention provides an air filter that is excellent in anti-molding and anti-bacterial functions. The anti-mold and anti-bacteria air filter is formed from fabric knitted and woven with a warp and/or a weft made of filiform thermoplastic resin including the organic anti-molding agent and filiform thermoplastic resin including the inorganic anti-bacterial agent. It is also possible to form multi-woven fabric knitted and woven with a warp made of filiform thermoplastic resin including the organic anti-molding agent and the filiform thermoplastic resin including the inorganic anti-bacterial agent.

16 Claims, 4 Drawing Sheets

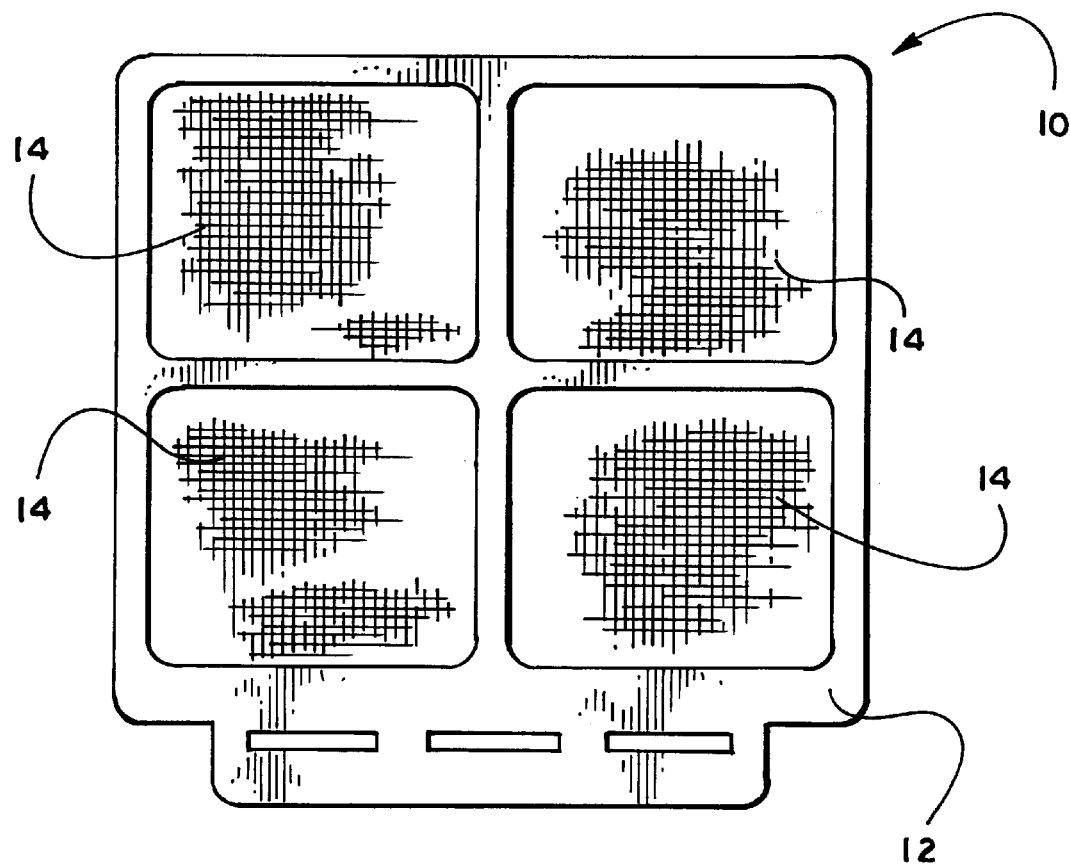
Fig_1
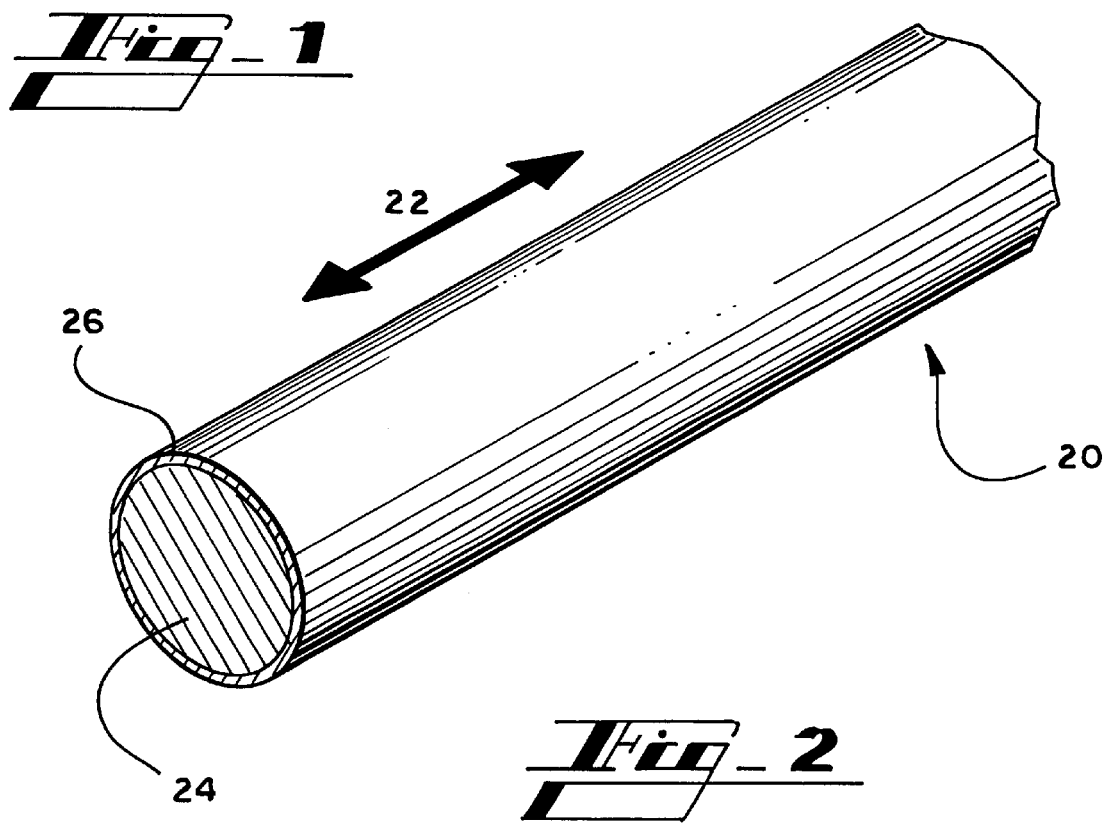
Fig_2

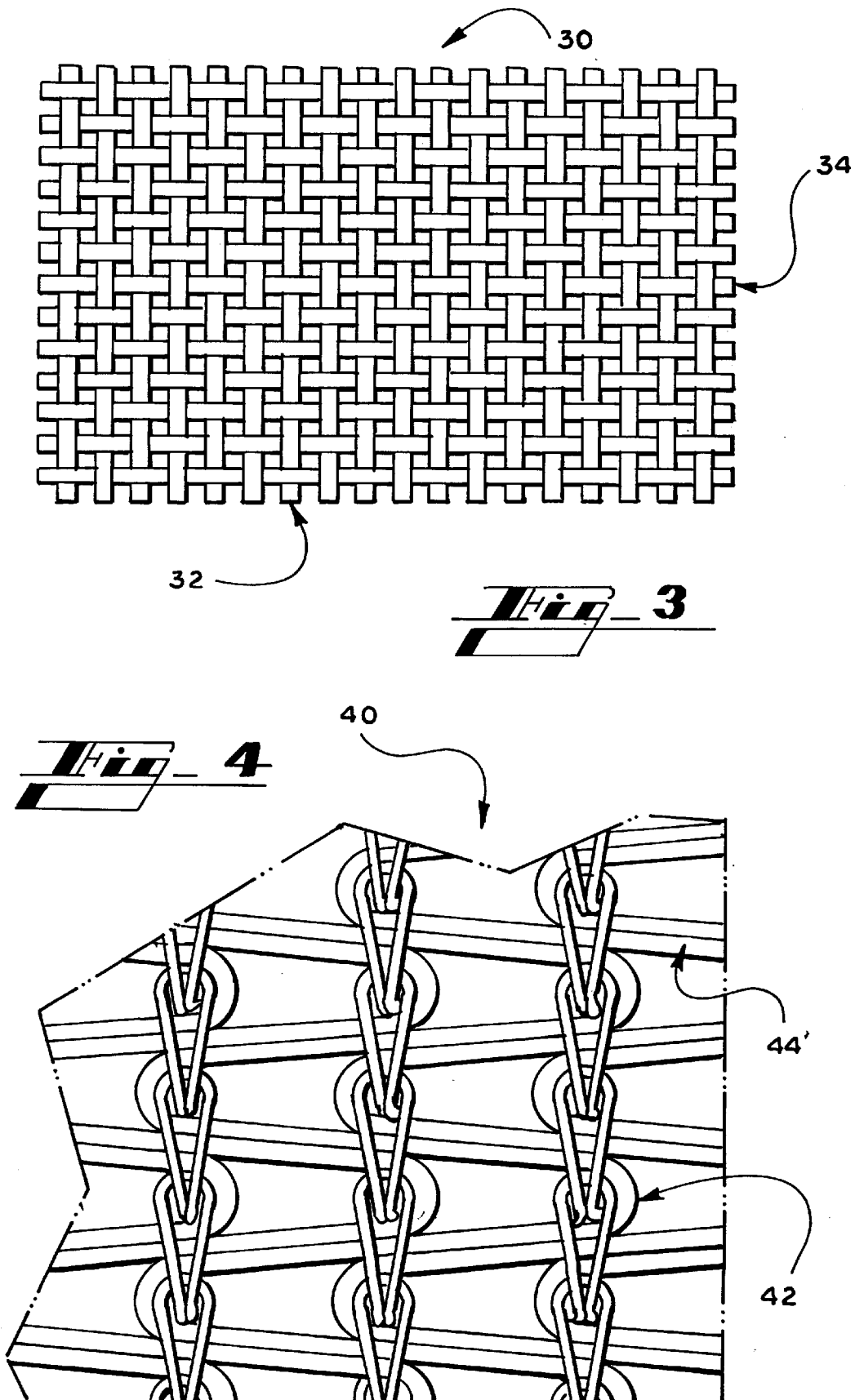

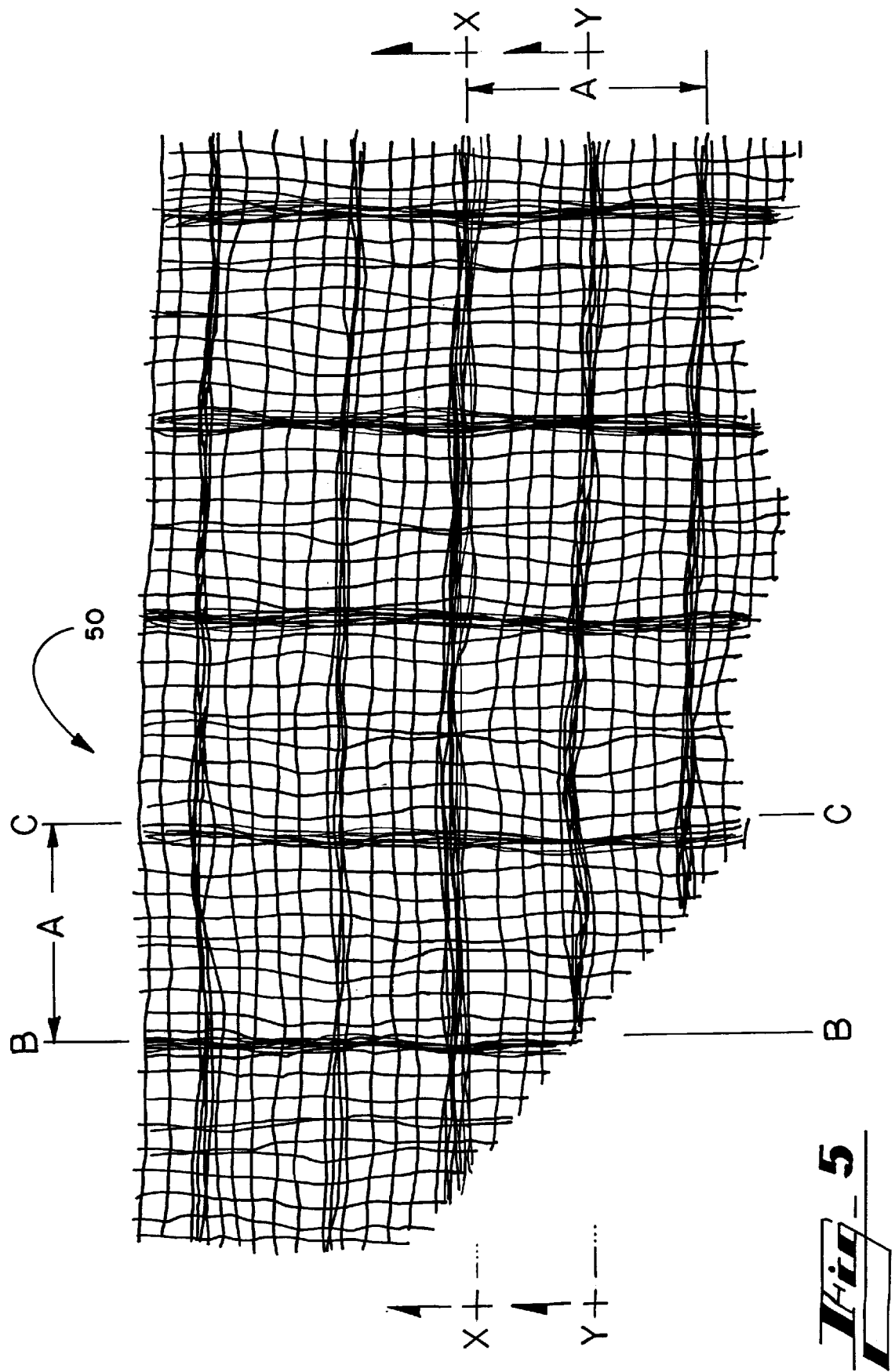
Fig_5

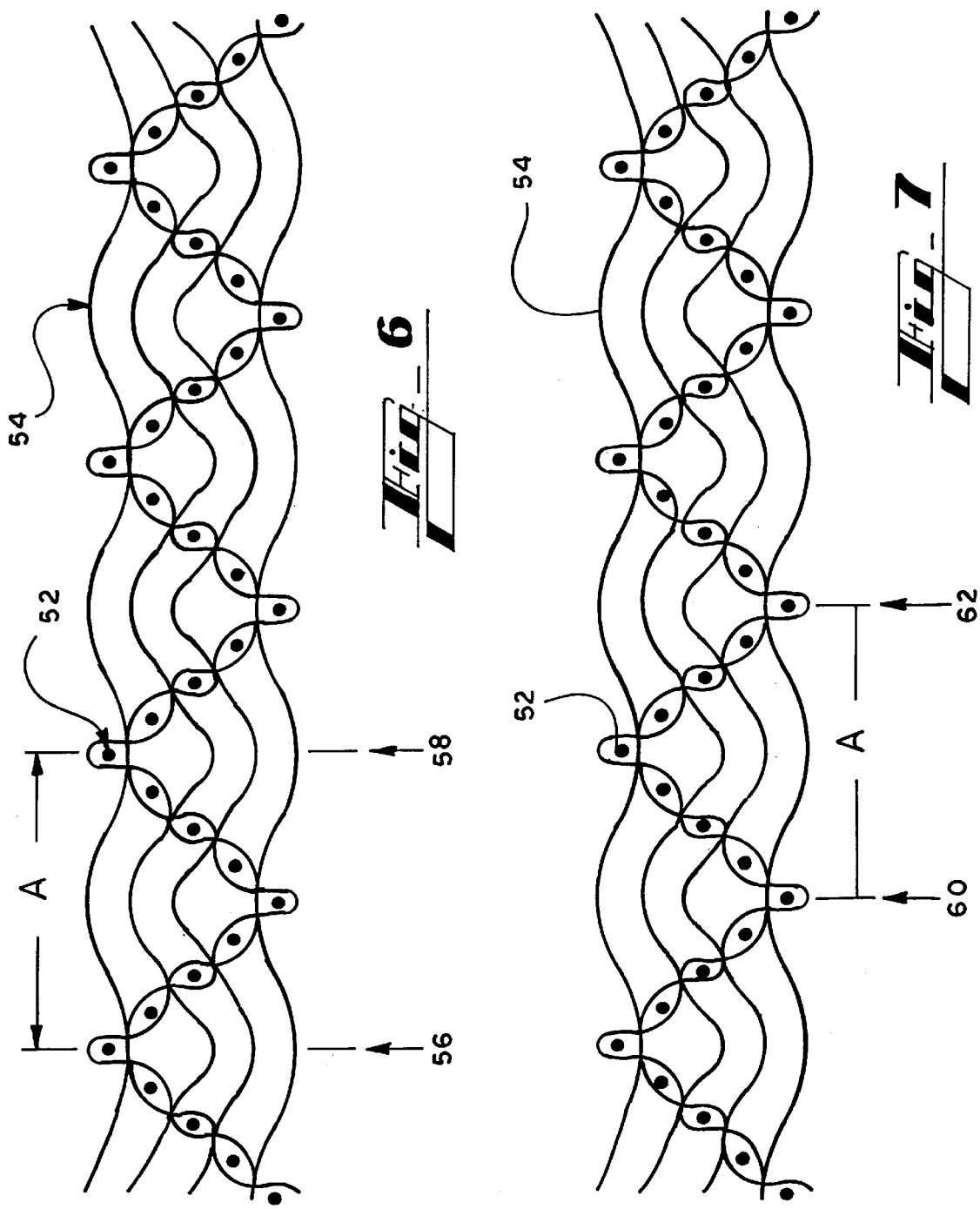

ANTI-MOLD AND ANTI-BACTERIA AIR FILTER

BACKGROUND OF THE INVENTION

1. Field of the Invention

This invention relates to anti-mold and anti-bacteria air filter.

2. Description of the Prior Art

Recently, interior and other goods such as clothes, bedding, furniture, carpets and so on have been treated to prevent mold, miscellaneous germs, etc. from proliferating because a comfortable life environment becomes more preferable and because mold, miscellaneous germs, etc. become more dislikable. The preference is not limited to such goods that people may touch directly, but extended to an air filter of an air cleaner or an air conditioner that is necessary for the human life nowadays. Thus, it is attempted to add anti-molding and anti-bacterial functions to the air filter so as to keep air clean.

This type of air filter is usually made of woven and knitted fabric composed of thermoplastic resin monofilaments of which anti-molding, anti-bacterial and other agents are mixed in the raw thermoplastic resin. The monofilaments, formed by melt extrusion, are knitted and/or woven as a warp and a weft resulting in the fabric for the air filter.

It is known that such organic anti-molding agent includes, for example, a VINYZENE anti-molding agent, a zinc pyrithione anti-molding agent, a PREVENTOL anti-molding agent, and so on, any of which is anti-bacterial mainly against mold and yeast. It is known that such inorganic anti-bacterial agent includes silver nitrate, silver sulfate, silver chloride and zeolite or silica gel that carries silver, copper, zinc and tin, any of which is effectively anti-bacterial against bacteria.

However, when both organic anti-molding and inorganic anti-bacterial agents are used in the same system, antagonism between these agents occurs such that the organic agent bleeding from a monofilament surface coats the inorganic agent, which functions anti-bacterially with the existence on the surface of the monofilament, or neutralizes a metal ion of the inorganic agent. There was a problem that air filter could not have both anti-molding and anti-bacterial functions satisfactorily.

3. Problem to be Solved by the Invention

It is the object of the present invention to provide an air filter that is superior in anti-molding and anti-bacterial characteristics so as to solve the above described problem.

SUMMARY OF INVENTION

The present invention, as means to solve the above described problem, provides an anti-mold and anti-bacteria air filter that is formed from fabric knitted and woven with a warp and/or a weft made of filiform thermoplastic resin including the organic anti-molding agent and filiform thermoplastic resin including the inorganic anti-bacterial agent. Therefore, the present invention is characterized by the fabric knitted and woven with a warp, with a weft, or with a warp and a weft made of two kinds of filiform thermoplastic resin including either, but not both, the anti-molding agent or the anti-bacterial agent.

It is also possible to form multi-woven fabric knitted and woven with a warp made of the filiform thermoplastic resin including the organic anti-molding agent and the filiform thermoplastic resin including the inorganic anti-bacterial agent.

BRIEF DESCRIPTION OF THE DRAWINGS

FIG. 1 is a plan view of an air filter for an air conditioner of an embodied example of the present invention.

FIG. 2 is a perspective view of a complex monofilament with a vertical cross section.

FIG. 3 is a plan view of an embodied example of plain weave.

FIG. 4 is a plan view of an embodied example of raschel knitting.

FIG. 5 is a plan view of an embodied example of a honeycomb weave structure fabric woven with a honeycomb weave structure.

FIG. 6 is a cross sectional view taken along line X—X of FIG. 5.

FIG. 7 is a cross sectional view taken along line Y—Y of FIG. 5.

DESCRIPTION OF PREFERRED EMBODIMENT

A preferred embodiment is described with the drawings below. FIG. 1 shows an air filter 10 for a home air conditioner of an embodied example of the present invention. The air filter 10 has a thickness of 2–3 mm and can be removed from and slid into an air-filter slot of the air conditioner. The air filter 10 comprises a frame 12 and four fabrics 14 fixed into four windows formed by the frame 12. The air filter 10 is an embodied example of the present invention. Thus, an air filter of the present invention may apply and be formed in a desired form for other models of air conditioners, air cleaners and so on.

Thermoplastic resin used for the anti-mold and anti-bacteria air filter of the present invention may be polyolefin resin, polyester resin, polyamide resin, polyacryl resin, polystylene resin, polyvinylchloride resin and so on. The polyolefin resin is preferable because it is relatively inexpensive but keeps a stable quality in a continuous production process. The polyolefin resin, for example, may be resin material made of one or more of polypropylene, high density polyethylene, mid density polyethylene, low density polyethylene, straight chain low density polyethylene, ethylene-propylene copolymer, ethylene-vinyl acetate copolymer, ethylene-acrylic ester copolymer and so on. The resin material made of polypropylene is, in particular, preferably used because a filament made of the material is superior in mechanical strength.

The organic anti-molding agent used for the present invention, for example, may be but not be limited to any of the following known agents: a VINYZENE anti-molding agent such as 10, 10'-oxybisphenoxyarsine, a zinc pyrithione anti-molding agent such as zinc-2-pyridinethiol-1-oxide, and a PREVENTOL anti-molding agent such as N-(fluorodichloro-methylthio)phthalimide, N-dimethyl-N'-phenyl-(N'-fluorodichloromethylthio)sulfamide. The organic anti-molding agent has an effective anti-bacterial function mainly to mold and yeast.

A suitable concentration of the above described organic anti-molding agent ranges from 0.01 to 5 weight percent to the thermoplastic resin, more preferably, from 0.1 to 1 weight percent. If the concentration of the agent is less than 0.01 weight percent, its anti-molding function may not be enough. If it exceeds more than 5 weight percent, the anti-molding function may not be increased with an increase of the concentration and the agent may bleed to cause a problem.

The inorganic anti-bacterial agent used for the present invention, for example, may be but not be limited to any of the following known materials: silver nitrate, silver sulfate, silver chloride and zeolite or silica gel that carries silver, copper, zinc and/or tin. The inorganic anti-bacterial agent is effectively anti-bacterial mainly to miscellaneous germs and/or bacteria.

A suitable concentration of the above-described inorganic anti-bacteria agent ranges from 0.1 to 5 weight percent to the thermoplastic resin, more preferably, from 0.5 to 2 weight percent. If the concentration of the agent is less than 0.1 weight percent, its anti-bacterial function may not be enough. If it exceeds more than 5 weight percent, the anti-bacterial function may not be increased with an increase of the concentration and excess amount of the agent gives an economical disadvantage.

The filiform member made of the above described thermoplastic resin mixed with the above described organic anti-molding agent and the above described inorganic anti-bacterial agent may be formed in various forms such as monofilament, mutifilament, flatyarn, splityarn and so on. The filiform member may be formed by a known forming method and preferably be formed in the monofilament form because it is easy to form and because the formed monofilament keeps a high strength.

The above described monofilament may preferably be a blade-sheath (core-clad) type of complex monofilament 20 because this type of monofilament keeps the high strength even though it includes the agent (FIG. 2). Therefore, the complex monofilament 20 has a blade (or core) member 24 positioned around the center in a cross section cut perpendicular to the longitudinal direction 22 of the monofilament and a sheath (or clad) member 26 formed to surround the blade member 24 wherein the organic anti-molding agent or the inorganic anti bacterial agent is included only in the sheath member 26 but not included in the blade member 24.

The complex monofilament is formed with a complex monofilament forming apparatus that has a complex nozzle of a blade-sheath structure, which has coaxial dual discharge openings and extruders, by melting and extruding a blade (or core) composition and a sheath (or clad) composition through the complex nozzle, by drawing with various types of heat drawings such as a hot air oven, a hot roller, a water bath and so on after cooling, and by treating in relaxation treatment. The blade sheath type of complex monofilament is preferably formed with the sheath composition including the agents. It is preferable not to mix the inorganic anti-bacteria agent with the blade or core composition so as to hold the mechanical strength and elasticity in the core. Further, it may improve the anti-molding function per the organic anti-molding agent to mix the organic anti-molding agent with the sheath composition and to facilitate the agent's moving toward the surface of the monofilament. Although the blade composition and the sheath composition could be the same or different, it is preferable to have the same material in order to improve adhesivity between the blade or core and the sheath or clad. It is also preferable to have a weight ratio between the blade composition and the sheath composition ranging from 1/1 to 4/1.

FIG. 3 shows a relationship between a warp 32 and a weft 34 in plain weave 30 as an example. The warp 32 or the weft 34 comprises single string. The warp 32 is woven in a longitudinal direction while the weft 34 is woven in a width direction at right angles to the longitudinal direction. FIG. 4 shows a relationship between a warp 42 and a weft 44 in raschel knitting 40 as an example. The warp 42 or the weft 44 comprises single string.

A fabric woven and knitted with warps and/or wefts made of (A) filiform thermoplastic resin including the organic anti-molding agent and (B) the filiform thermoplastic resin including the inorganic anti-bacterial agent is used for the air filter of the present invention.

The filiform resins (A) and (B) may be mixed at any weight ratio for the purpose to obtain necessary anti-molding and anti-bacterial functions. The following combinations, for example, may be applied in accordance with the present invention: (A)/(B), (B)/(A), (A)/(A+B), (B)/(A+B), (A+B)/(A), (A+B)/(B) and (A+B)/(A+B), where (A)/(B) means that (A) is a weft/(B) is a warp.

However, using (A) and/or (B) as a weft in a production process may cause deterioration of productivity because it is necessary to exchange the beam warped with (A) and/or (B) at the time of starting to produce another kind of product. Thus, it is preferable to use as a weft a monofilament that is used in a general production and does not include either anti-molding or anti-bacterial agent and to use the monofilament that includes (A) and/or (B) as a warp so as to form multi-woven woven and knitted fabric with a multi-woven woven and knitted machine. Such configuration may enable to improve the productivity and lower the cost because of reduction of the work load of exchanging the warped beam. Thus, an anti-molding and anti-bacterial air filter that has enough anti-molding and anti-bacterial functions and potential to lower the cost because of the high productivity may be obtained.

The woven and knitted texture of the woven and knitted fabric mentioned above can be any type of texture. If the fabric is a woven fabric, for example, plain weave, twill weave, gauze elastic webbing, gauze weave, leno weave, etc. may be adopted. If the fabric is a knitted fabric, for example, tricot knitting, milanese knitting, raschel knitting, etc. may be adopted.

However, a honeycomb weave structure (FIGS. 5, 6 and 7) of filiform member with the fineness ranging from 80 to 500 dr is preferable because of its elasticity, flexibility, permeability, dust removability and dimensional stability required for the air filter. The honeycomb weave structure is defined as "derivative weave structure with woven honeycomb concave-convex texture on the surface. It may be called MASUORI." in the textile terms (the textile chapter) of Japan Industrial Standard JIS-L0206.

FIG. 5 shows a plan view of a honeycomb weave structure fabric woven with a honeycomb weave structure. In the figure, "A" and "A'" stand for lengths of edges of each honeycomb weave structure unit. FIG. 6 shows a cross sectional view taken along line X—X of FIG. 5. It is clear that a warp 52 and a weft 54 are woven to form concave-convex structure on front and back sides of the fabric. The figure also shows B—B and C—C line-positions 56, 58 and their relationship with the edge length A. FIG. 7 shows a cross sectional view taken along line Y—Y shifted A'/2 from the line XX. Likewise, the figure illustrates the warp 52 and the weft 54, and B—B and C—C line-positions 60, 62 and their relationship with the edge length A.

The honeycomb weave structure may be formed continuously with a Sulzer weaving machine and be characterized by a three dimensional structure with concave-convex front and back surfaces. It is important that the air filter of the present invention has a weaving concentration of a weft and a warp strings ranging from 30 to 75 stitches per inch.

Without departing from the spirit and scope of the present invention, usually-used additives such as an antioxidant, a UV-absorbent, a light stabilizer, a dispersant, a lubricant, an antistatic agent, a pigment, an inorganic filler, a flame retardant, a cross linking agent, a foaming agent, a nucleus forming agent and so on may be mixed with the thermoplastic resin of the present invention.

EXAMPLE 1

An anti-molding monofilament and an anti-bacteria monofilament were formed with a extruding machine by melt-extruding a composition of 0.5 weight percent of anti-mold agent (10, 10'-oxybisphenoxyarsine) to the polypropylene (MFR=1.2 g/10 min., Tm=161° C.) and a composition of 1 weight percent of silver zeolite as anti-bacteria agent to the polypropylene (MFR=1.2 g/10 min., Tm=161° C.), respectively. The extruded monofilaments were drawn about at the factor of 8 with a hot air oven type of drawing machine after cooling and then treated in heat relaxation to obtain the anti-molding monofilament and the anti-bacterial monofilament with the fineness of 150 dr.

A weft with the fineness of 150 dr was prepared from above mentioned polypropylene. A honeycomb weave structure fabric having a density of 60×60 stitches per inch and the honeycomb weave structure unit with each edge length of 5.2 mm and thickness of 2.2 mm was formed with a multi weaving machine by weaving with the polypropylene weft and the alternative warp of the anti-molding monofilament and the anti-bacterial monofilament. The fabric was applied to an air filter (Example 1) as an embodiment of the present invention.

Comparative Example 1

A composition of 0.5 weight percent of anti-molding agent (10, 10'-oxybisphenoxyarsine) and 1 weight percent of silver zeolite as anti-bacterial agent to the polypropylene (MFR=1.2 g/10 min., Tm=161° C.) was used to form a monofilament. An air filter (Comparative Example 1) was formed in the same manner as described in Example 1 except using this monofilament as a warp.

Comparative Example 2

The polypropylene (MFR=1.2 g/10 min., Tm=161° C.) was used to form a monofilament. An air filter (Comparative Example 2) was formed in the same manner as described in Example 1 except using this monofilament as a warp.

The above mentioned air filters were tested for anti-molding and anti-bacterial capability as described bellow. The results are summarized in Tables 1(a) and (b).

Testing bacteria: Aspergillus niger as Eumycetes and coliform bacillus as bacillus were used.

Preparation: The Eumycetes was pre-cultured in potato dextrose agar medium at 27° C. for one week. The bacillus was precultured in standard agar medium at 35° C. for 48 hours. The testing bacteria liquid was prepared with the pre-cultured bacteria and phosphate buffered saline.

Process: In accordance with the disk method, the following steps were taken.
1. A piece of filter paper was impregnated with the testing bacteria liquid (0.5 ml).
2. The filter paper was placed on a specimen statically.
3. The filter paper on the specimen was put in a culturing container and the bacteria were cultured for a prescribed period of time.
4. The filter paper on the specimen was taken out of the container.
5. The filter paper was picked up of the specimen.
6. The filter paper was thrown into 5 ml of sterilized water (ten times dilution) and the mixture was stirred.
7. Supernatant liquid of the mixture was smeared in the same culture media as used in the pre-culture.
8. The bacteria were cultured in the same manner as described in the pre-culture.
9. Each living bacteria was counted and the number of bacteria in 1 ml of the supernatant liquid was calculated.

TABLE 1 (a)

| Bacteria | Aspergillus Niger | | | |
|---|---|---|---|---|
| Time | START | 24 HOURS | 48 HOURS | 72 HOURS |
| Example 1 | $1.4 \times 10^6$ | $9.0 \times 10^4$ | $5.0 \times 10^4$ | $2.0 \times 10^3$ |
| Comparative Example 1 | $1.4 \times 10^6$ | $3.0 \times 10^5$ | $1.0 \times 10^5$ | $1.0 \times 10^4$ |
| Comparative Example 2 | $1.4 \times 10^6$ | $3.0 \times 10^5$ | $1.0 \times 10^5$ | $1.0 \times 10^5$ |

(The number of bacteria in 1 ml)

TABLE 1 (b)

| Bacteria | Coliform Bacillus | | | |
|---|---|---|---|---|
| Time | START | 24 HOURS | 48 HOURS | 72 HOURS |
| Example 1 | $5.6 \times 10^6$ | $1.1 \times 10^6$ | $2.0 \times 10^5$ | $1.0 \times 10^3$ |
| Comparative Example 1 | $5.6 \times 10^6$ | $1.8 \times 10^6$ | $6.0 \times 10^5$ | $1.0 \times 10^5$ |
| Comparative Example 2 | $5.6 \times 10^6$ | $2.7 \times 10^6$ | $1.6 \times 10^6$ | $1.0 \times 10^6$ |

(The number of bacteria in 1 ml)

It is confirmed that the air filter of Example 1 worked effectively in anti-molding and anti-bacterial functions from Tables 1(a) and (b).

Achievement

The air filter of the present invention has excellent anti-molding and anti-bacterial functions since the anti-molding agent and an anti-bacterial agent are mixed separately with thermoplastic resin so as to prevent the antagonistic action. It also has high and stable productivity and flexibility as filiform member, and high strength. Further, the honeycomb weave structure, as a filter structure, made of filiform member of a specific fineness has excellent elasticity, flexibility, permeability, removability and dimensional stability required for the air filter. Thus, the air filter quite effective with respect to productivity and desired functions was obtained according to the present invention.

What is claimed is:

1. An anti-molding and anti-bacterial air filter comprising an anti-molding agent and an anti-bacterial agent, said anti-molding agent being an organic anti-molding agent, said anti-bacterial agent being an inorganic anti-bacterial agent, said fabric further comprising filiform thermoplastic resin including said organic anti-molding agent and filiform thermoplastic resin including said inorganic anti-bacterial agent, and wherein said filiform thermoplastic resin including said organic anti-molding agent does not include said inorganic anti-bacterial agent, and said filiform thermoplastic resin including said inorganic anti-bacterial agent does not include said organic anti-molding agent such that antagonism between the two agents is prevented.

2. The air filter of claim 1, wherein said fabric comprises a weft, and said weft comprises said filiform thermoplastic resin including said organic anti-molding agent.

3. The air filter of claim 1, wherein said fabric comprises a weft, and said weft comprises said filiform thermoplastic resin including said inorganic anti-bacterial agent.

4. The air filter of claim 1, wherein said fabric comprises a weft, and said weft comprises said filiform thermoplastic resin including said organic anti-molding agent and said filiform thermoplastic resin including said inorganic anti-bacterial agent.

5. The air filter of claim 4, wherein said fabric is a multi-woven fabric.

6. The air filter of claim 1, wherein said fabric comprises a warp, and said warp comprises neither said filiform thermoplastic resin including said organic anti-molding agent nor said filiform thermoplastic resin including said inorganic anti-bacterial agent.

7. The air filter of claim 1, wherein said organic anti-molding agent is a 10, 10'-oxybisphenox-arsine anti-molding agent.

8. The air filter of claim 4, wherein said organic anti-molding agent is a 10, 10'-oxybisphenox-arsine anti-molding agent.

9. The air filter of claim 1, wherein said inorganic anti-bacterial agent is a silver zeolite anti-bacterial agent.

10. The air filter of claim 4, wherein said inorganic anti-bacterial agent is a silver zeolite anti-bacterial agent.

11. The air filter of claim 1, wherein both said filiform thermoplastic resins are formed in a monofilament.

12. The air filter of claim 4, wherein both said filiform thermoplastic resins are formed in a monofilament.

13. The air filter of claim 11, said monofilament having a blade member positioned around the center in a cross section cut perpendicular to the longitudinal direction of said monofilament and a sheath member formed to surround said blade member, wherein said blade member comprises neither said organic anti-molding agent nor said inorganic anti-bacterial agent.

14. The air filter of claim 12, said monofilament having a blade member positioned around the center in a cross section cut perpendicular to the longitudinal direction of said monofilament and a sheath member formed to surround said blade member, wherein said blade member comprises neither said organic anti-molding agent nor said inorganic anti-bacterial agent.

15. The air filter of claim 1, wherein said fabric further comprises a honeycomb weave structure.

16. The air filter of claim 4, wherein said fabric further comprises a honeycomb weave structure.

* * * * *

UNITED STATES PATENT AND TRADEMARK OFFICE
CERTIFICATE OF CORRECTION

PATENT NO. : 6,165,243   Page 1 of 1
DATED : December 26, 2000
INVENTOR(S) : El Kawaguchi and Hideo Shiozawa It is certified that error appears in the above-identified patent and that said Letters Patent is hereby corrected as shown below:

Claim 1,
Line 6, immediately after ( col. 6, line 54), insert the line -- said air filter comprising a fabric, --

Signed and Sealed this

Thirtieth Day of October, 2001

*Attest:*

*Attesting Officer*

NICHOLAS P. GODICI
*Acting Director of the United States Patent and Trademark Office*